United States Patent [19]

Lombard

[11] Patent Number: 5,209,156

[45] Date of Patent: May 11, 1993

[54] EXTRUDING AND CUTTING FROZEN CONFECTIONS CONTAINING EDIBLE PARTICULATES

[76] Inventor: Marco H. Lombard, 1704 Thousand Oaks Cir., Austin, Tex. 78746

[21] Appl. No.: 786,247

[22] Filed: Oct. 31, 1991

[51] Int. Cl.[5] .................... A23G 9/00; A23G 9/04; A23G 9/22

[52] U.S. Cl. .................. 99/450.1; 99/450.7; 99/452; 99/494; 425/126.2; 425/132; 425/133.1

[58] Field of Search ............... 99/353, 450.1, 450.2, 99/450.6, 450.7, 494, 452, 455; 425/133.1, 132, 114, 142, 145, 164, 166, 168, 126.2; 264/245, 246, 171, 172, 141, 40.7; 426/502, 512, 513, 516, 272, 274, 275, 297

[56] References Cited

U.S. PATENT DOCUMENTS

| | | | |
|---|---|---|---|
| 3,761,213 | 9/1973 | Wight | 425/131.1 |
| 3,795,183 | 3/1974 | Roth et al. | 99/353 |
| 3,840,311 | 10/1974 | Wight | 99/450.2 |
| 4,237,145 | 12/1980 | Rismon et al. | 99/450.7 |
| 4,447,458 | 5/1984 | Roth et al. | 426/275 |
| 4,643,905 | 2/1987 | Getman | |
| 4,659,580 | 4/1987 | Svengren | |
| 4,715,275 | 12/1987 | Getman | 99/450.1 |
| 4,746,523 | 5/1988 | Binley | 99/455 |
| 4,752,197 | 6/1988 | Getman | 425/133.1 |
| 4,793,786 | 12/1988 | Greenhouse et al. | 425/133.1 |
| 4,859,165 | 8/1989 | Hoashi | 99/450.7 |
| 4,925,380 | 5/1990 | Meisner | 264/171 |

FOREIGN PATENT DOCUMENTS

| | | | |
|---|---|---|---|
| 0953158 | 8/1974 | Canada | 99/450.7 |
| 0724549 | 2/1955 | United Kingdom | 425/126.2 |

*Primary Examiner*—Timothy F. Simone

[57] ABSTRACT

A method for producing extruded and cut frozen confections (70) containing a first material (20) with particulates such as peanuts, and a second material (16) without particulates. Includes an extruder apparatus (10) with a first conduit (14) disposed to accept the first material, and a second conduit (18) disposed to accept the second material. And comprises diverter cylinders (22) and (24) opening into the conduits to cyclicly extract or inject the materials from the conduits, to produce intermittent flows within the inlet conduits (14) and (18). Next the materials alternately fill a transverse section of a confluence (42) to form a transversely layered extrusion (35). A conventional cutter is timed to transversely sever the transversely layered extrusion when a transverse layer of particulates free material is exiting.

13 Claims, 6 Drawing Sheets

EXTRUDING AND CUTTING FROZEN CONFECTIONS CONTAINING EDIBLE PARTICULATES

BACKGROUND

1. Field of the Invention

The invention relates to the manufacture of extruded and cut multi-ingredient food products and especially to extruded and cut hand-held and stick-held frozen confections.

2. Description of Prior Art

Conventional methods for producing extruded and cut frozen confections depend on the extruded material to be soft and of uniform consistency. Any non-uniform discrete material such as nuts or peanuts, in the prior art, extrusion material, caused the cutting device, in the process of segmenting the extrusion into separate confections, to impinge on the discrete material in an elastic collision, rather than the perceived inelastic collision which occurs when the cutting device passes thru soft uniform extrusion material. The elastic collision being destructive to the cut edge of the frozen confections, precluded the addition of discrete material in the prior art extrusion methods. In addition conventional methods for producing extruded and cut stick-held frozen confections depended on the extruded material to be soft and of uniform consistency. Any discrete material such as nuts or peanuts in the prior art extrusion material caused the stick, in the process of post extrusion insertion, to impinge on the discrete material in an elastic collision, rather than the perceived inelastic collision which occurs when a stick is inserted into soft uniform extrusion material. The elastic collision being destructive to the integrity of the frozen confection precluded the addition of discrete material in the conventional extrusion methods for producing extruded and cut stick-held frozen confections.

Idealy the discrete material should be in the extrusion, but not in the area traversed by the cutting device in the process of segmenting the extrusion, or in the area which will be occupied by a stick in post extrusion stick insertion.

Prior art attempts to isolate the discrete material from the cutting device by including the discrete material in a filling material which is then completely enclosed in a coating material depend on converging flow terminators to affect the desired intermittent flow of the filling material. These converging flow terminating methods in the act of terminating the flow of the filling material containing discrete items such as peanuts, either damage the discrete material, or become jammed, or do not seal completely when attempting to close on to the discrete material, thus resulting in an unacceptable high product scrap rate. A prior art method which encloses a soft uniform material within another soft uniform material using a converging flow terminator, is taught by Svengren in U.S. Pat. No. 4,659,580. Apr. 21, 1987

To circumvent the problems associated with including discrete material in the extruded and cut frozen confection, conventional methods use subsequent devices to add discrete material such as peanuts to the exterior of an extruded and cut confection base of uniform consistency, usually as the extruded and cut base is moved forward by some conveyor mechanism to receptive discrete material dispensing devices which employ gravity or other impinging methods to attach the discrete material to the exterior of the extruded and cut confection base. In addition prior art methods employ subsequent devices to firmly attach the discrete material to the exterior of the extruded and cut confection base usually as it moves forward by some conveyor device to a chocolate enrobing machine, the enrobing chocolate as it congeals, seals and firmly cements the discrete material to the extruded and cut confection base. One such process is taught by Getman in U.S. Pat. No. 4,643,905. Feb. 17, 1987

Conventional techniques for including discrete material in frozen confections by attaching the discrete material to the surface of an extruded and cut confection base suffer from a number of disadvantages:

(A) The subsequent attaching of discrete material to the surface of an extruded and cut confection base requires costly devices that take up considerable conveyor space and are correspondingly expensive to maintain.

(B) Attaching the discrete material to the surface of an extruded and cut base, does because of its nature, usually result in a percentage of the costly discrete material being irrecoverably lost during the process.

(C) Attaching the discrete material to the surface of an extruded and cut base does because of the inconsistency in the amount of material adhering to the surface, requires that an excess of the costly discrete material be used to assure that the product remains within the U.S. Government labeling specifications for ingredients and weight.

(D) Attaching the discrete material to the surface of an extruded and cut base can expose the frozen confection to the entrapment of air-borne pathogens due to the successive layering of ingredients as the product progresses forward by conveyor from one station to another.

(E) Attaching the discrete material to the surface of an extruded and cut base depends on uniform, dry, and non-sticky discrete material, thus precluding strawberries, cherries, and other desirable ingredients.

(F) The successive layering with discrete material and subsequent coating of prior art frozen confections leave the finished product with an uneven rough finish preventing any printed designs, screening, or added information on the surface of the completed confection.

OBJECTS AND ADVANTAGES

Accordingly several objects and advantages of this invention are:

(A) To provide a process for producing extruded and cut frozen confection containing discrete material such as peanuts within the envelope of the extruded and cut frozen confection.

(B) To provide a smaller less labor intensive machine requiring a fraction of the conventional conveyor space to produce extruded and cut frozen confections containing discrete material such as peanuts.

(C) To provide an extrusion method for placement of discrete material within an extruded frozen confection but not in the area traversed by the cutter mechanism in the process of segmenting the extrusion into extruded and cut frozen confections.

(D) To provide an extrusion method for placement of discrete material within an extruded and cut frozen confection but not in the area traversed by the cutter mechanism in the process of segmenting the extrusion, and not in the area for subsequent stick insertion for a stick-held frozen confection.

(E) To provide an extruded and cut frozen confection containing discrete material, wherein the cut frozen confection has smooth surfaces suitable for accepting subsequent applied lettering, decorations, or designs thereon.

(F) To provide a uniform multi-ingredient extruded and cut frozen confection, resulting in less rejection loss where rejection loss occurs due to failure to meet package labeling specifications of ingredients and weight.

(G) To provide a method for producing extruded and cut frozen confections containing discrete material such as peanuts, capsules, nuts, cherries, strawberries, or other ingredients, without inflicting damage to the discrete material in the process of extruding and cutting the extrusion into individual confections.

(H) To provide a process without converging parts, for converting a flow of a material in a conduit, to an intermittent flow downstream in the conduit, and particularly adaptable to the manufacture of extruded and cut multi-ingredient frozen food products containing discrete material such as edible solids within a soft uniform base material.

Further objects and advantages are to provide an extrusion method with the flexibility for programmable in-process product changes for a variety of extruded and cut frozen confections without need to interrupt production, and further objects and advantages will become apparent from a consideration of the ensuing descriptions and drawings.

SUMMARY OF THE INVENTION

The invention provides a diverter valving method to circumvent the cutting action converging flow terminating devices have on discrete solids when the solid ingredients are caught by the converging components of the devices, and in particular the invention provides a method for producing extruded and cut frozen confections containing whole items such as nuts, cherries, strawberries, or other ingredients within the extruded frozen confections but avoiding the area of the frozen confection traversed by a severing device in the process of segmenting the extrusion into individual confections, or the area occupied by a stick in stick-held confections.

DESCRIPTION

FIG. 1

Figure 1:
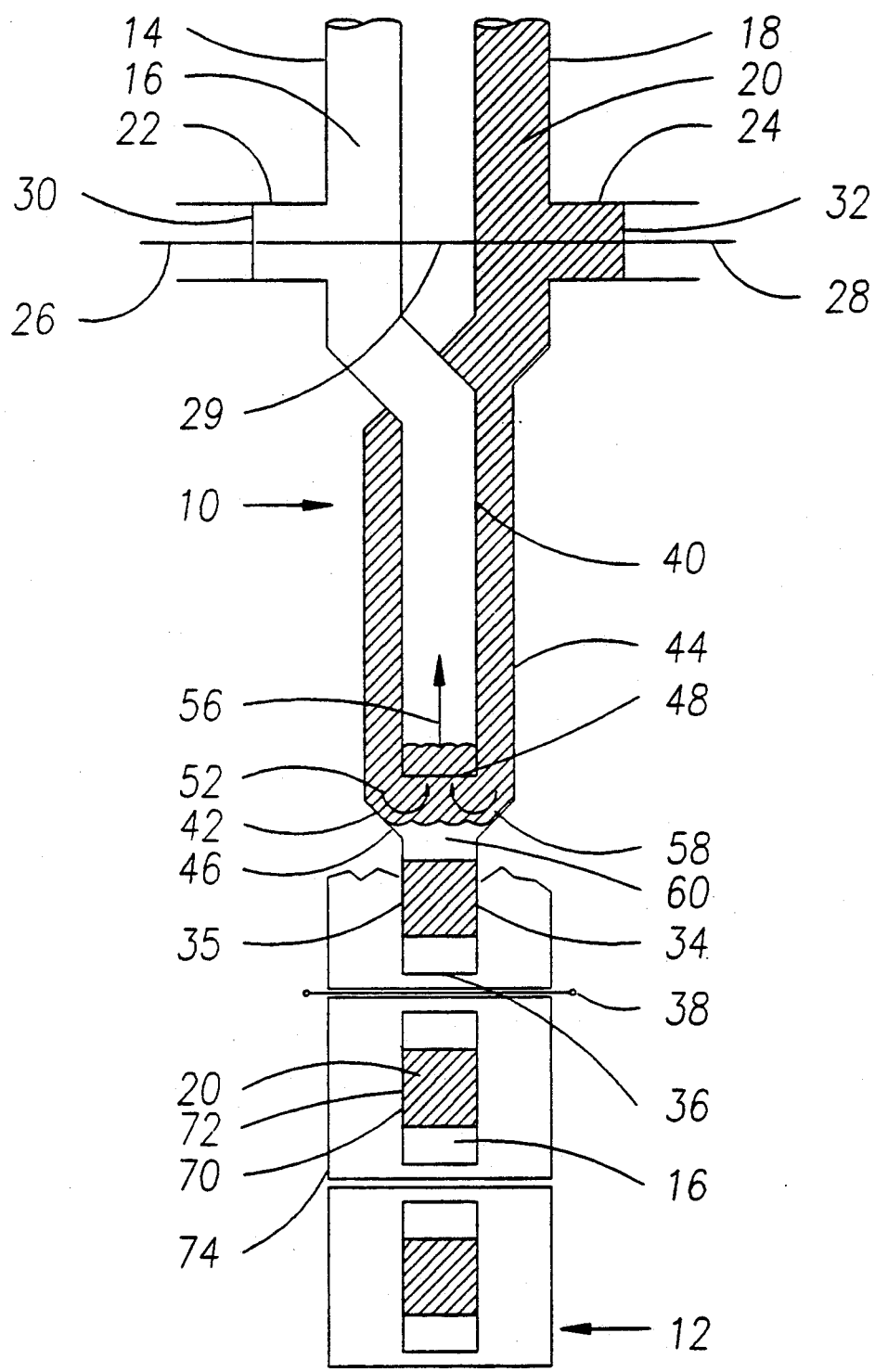
FIG. 1 Is a schematic sectional top view of an extruder apparatus according to the present invention for producing multi-ingredient extruded and cut frozen confections with provision to include edible solids in selected areas.

A typical embodiment of the apparatus of the present invention is illustrated in FIG. 1 In which there is shown a schematic sectional top view of an extruder apparatus 10 situated over a conveyor 12. A first conduit 18 and a second conduit 14 are each disposed to accept a flow of material from conventional blenders. Downstream and forming an opening into the first conduit 18 is a first diverter cylinder 24 which is provided with a piston 32 driven by a piston rod 28, and forming an opening into the second conduit 14 is a second diverter cylinder 22 which is provided with a piston 30 driven by a piston rod 26. Both piston rods 26 and 28 are disposed and adaptable to be driven by conventional methods such as an air cylinder or a cam driven by a variable speed motor. The diverter cylinders are disposed onto their respective conduits to enable the extraction or injection of material into or out of their respective conduits.

Downstream from the diverter cylinders the two separate conduits 14 and 18 join coaxially such that one conduit 14 forms an inner conduit 40 and the other conduit 18 forms an outer conduit 44 of extruder apparatus 10.

To maintain an even flow speed, inner conduit 40 and outer conduit 44 have the same cross section area. The outer conduit 44 extends past the end of inner conduit 40 to form a common composing chamber 42, which is the confluence of the inner and the outer conduits. Further down stream and depending on the product configuration, composing chamber 42 may have a reduced cross sectional area 46 to provide a transition into a common extruder spout 34 with a die end 36. A conventional cutter mechanism 38 such as a heated wire is situated to sever the extrusion at die end 36 of extruder spout 34.

OPERATION

FIGS. 1 AND 2

Figure 2:
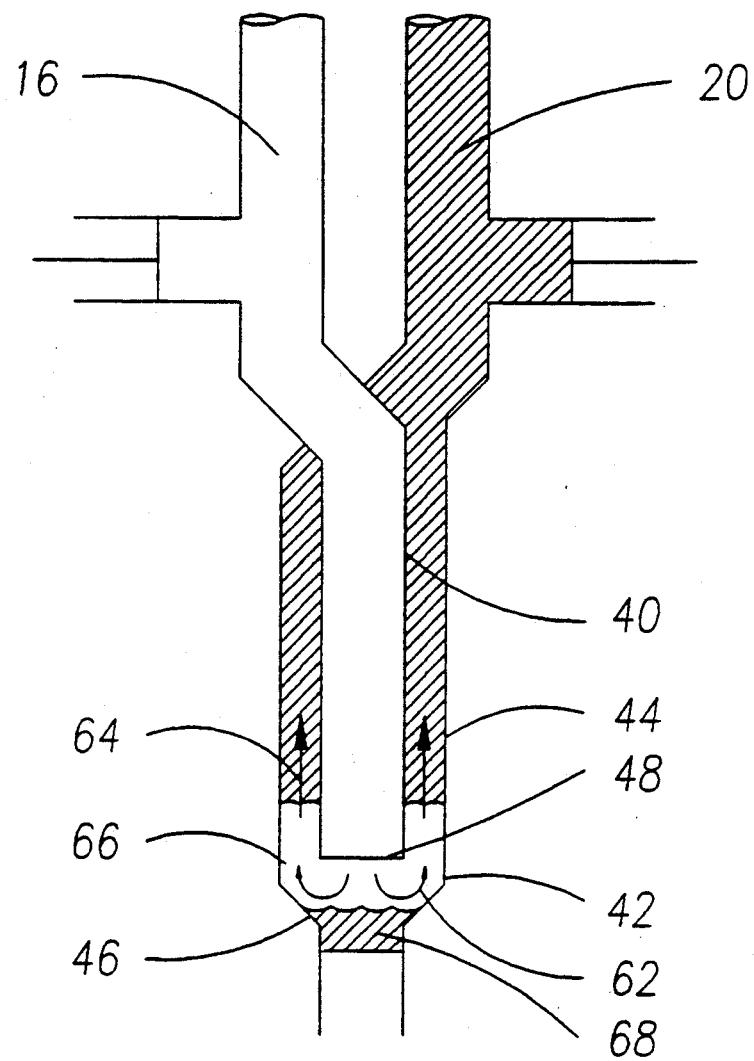
FIG. 2 Is a partial sectional top view of the apparatus shown in FIG. 1.

The operation of the extruder is illustrated in FIGS. 1 And 2 in which, for descriptive purposes, the commencement of the cycle is shown in FIG. 1, Where from suitable blenders not shown, two separate blends of ice cream, or other edible material, are introduced to separate conduits 14 and 18 of extruder apparatus 10. For example conduit 18 could be for the introduction of a blend of material 20 containing discrete material such as peanuts or other edible solids at a first flow, which for this description is a constant controlled input volume of (XL.P.M.), That is, (X liters per (M)), and conduit 14 could be for the introduction of a blend of material 16 without discrete material at a second flow, which for this description is a constant controlled input volume of (XL.P.M.), That is, (X liters per (M)). Piston rod 26 and piston rod 28 are driven by conventional mechanical or other method and synchronized to the motion of conveyor 12 and cutter 38 by conventional phaser methods.

The action of the diverter cylinders is such that while diverter cylinder 22 extracts material 16 from its connecting conduit 14 by the action of piston rod 26 driving piston 30, diverter cylinder 24 injects material 20 into its connecting conduit 18 by the action of piston rod 28 driving piston 32. Likewise when diverter cylinder 22 injects material 16, diverter cylinder 24 extracts material 20. The diverter cylinders operate out of phase of each other such that piston rod 26 and piston rod 28 could be one piston rod 29, however for greater product adjustability, separate piston rods are shown in this description.

Each of the diverter cylinders 22 and 24 is adjusted, by altering the stroke and velocity of piston rod 26 and piston rod 28 by conventional methods to accomodate a volume per given time equal to the first flow into the first conduit (XL.P.M.) Plus an extra amount (YL.P.M.), For a total of (X+YL.P.M.) For each of the diverter cylinders wherein:

M=(30/V) the tentative time in seconds required to produce one transverse layer of material in the composing chamber 42 when the conveyor 12 moves at a rate of V plates per minute.

X=a volume in liters per (M) introduced by the blender and determined by the volume of the desired confection.

Y=a volume percentage of (X), relating to a material's resistance to separate when pulled apart. The value of (Y) must be determined empiricly by the practitioner in the process of setting up the product and its parameters. Generally the value for (Y) can be lower for a material which separates easily and or contains small particulates, and higher for sticky, difficult-to-separate material and or containing large particulates.

When a diverter cylinder is in the injection part of its cycle, the net flow down stream in its system of the extruder apparatus is; the controlled input rate from the blender, plus the volume the diverter cylinder is injecting, which is:

$$(XL.P.M.)+(X+YL.P.M.)=(2X+YL.P.M.)$$

In other words, while a diverter cylinder is injecting material the flow down stream in its system of the extruder apparatus more than doubles.

Conversely while a diverter cylinder is in the extracting part of its cycle, the net flow downstream in its system of the extruder apparatus is the controlled input rate from the blender, minus the volume the diverter cylinder is extracting, which is:

$$(XL.P.M.)-(X+YL.P.M.)=(-YL.P.M.)$$

In other words, while a diverter cylinder is in the extracting part of its cycle, the flow of material down stream in its system of the extruder apparatus is reversed and momentarily flows backward.

The flow reversal is induced by the difference in rate between the controlled input rate from the blender (XL.P.M.) And the volume the diverter cylinder is extracting (X+YL.P.M.) The difference being (−YL.P.M.). The value (Y) determines the magnitude of backward flow.

The momentary flow reversal in the inner conduit 40 coincides with the momentary flow increase in the outer conduit 44, this action is translated to that portion of the extruder apparatus where inner conduit 40 ends 48, such that;

when diverter cylinder 22 is extracting material, the momentary flow reversal occurs in inner conduit 40 inducing a momentary pressure drop in inner conduit 40 while concurrently diverter cylinder 24 is injecting material thereby inducing a momentary pressure increase in outer conduit 44. The boundary of pressure differential occurs at end 48 of inner conduit 40. This pressure differential causes material 20 in outer conduit 44 with the higher pressure to exert a radial sphincter-like force 52 on the lower pressure material 16 of inner conduit 40, while material 16 of inner conduit 40 with lower pressure and reverse flow, exerts a rearward pulling force 56 on material 16 in inner conduit 40, the combination of forces enable material 20 to intrude into conduit 40 sufficiently as determined by the value (y) to assure the momentary filling of a transverse section 58 of composing chamber 42 exclusively with material 20 from outer conduit 44, thus positively separating material 16 of inner conduit 40 from its parent material 60, swept down stream.

Conversely when the momentary flow reversal is in outer conduit 44, (referring now to FIG. 2) There is a momentary pressure drop in outer conduit 44 and a momentary pressure increase in inner conduit 40. The boundary of pressure differential occurs at end 48 of inner conduit 40, this pressure differential causes material 16 in inner conduit 40 with its higher pressure to exert a ballooning like pushing force 62 on the lower pressure material 20 in outer conduit 44, while material 20 in outer conduit 44 with its lower pressure and reverse flow exerts a pulling force 64 on material 20 in outer conduit 44. The combination of forces enable material 16 to intrude into conduit 44 sufficiently as determined by the value (y) to assure the momentary filling of a transverse section 66 in composing chamber 42 exclusively with material 16 from inner conduit 40 thereby positively separating material 20 in outer conduit 44 from its parent material 68 swept downstream.

Since the complimentary action of the diverter cylinders cancel each other, (referring now to FIG. 1) The net flow out of extrusion die 36 remains a constant (2XL.P.M.); However the extrusion has become transversely layered 35 due to the cycling action of the diverter cylinders, half of the time the material extruded is free of discrete material, and half of the time the material extruded contains discrete material.

Cutter 38 is timed and adjusted by conventional phaser methods to cut thru the extrusion when extruded material is exiting the die end 36 of extruder spout 34 at a time when the transversely layered material is free of discrete material, thus providing extruded and cut frozen confections 70 with cut ends of easily cut particulate free material 16 and containing a transverse layer 72 of material 20 with desirable discrete material such as peanuts. The customary separation and centering of the cut frozen confection 70 on the conveyor plates 74 is achieved by oscillating extruder apparatus 10 by conventional cam methods timed and adjusted by conventional phaser methods to conveyor 12. The product is then transported by conveyor 12 for further processing and or packaging.

Although diverter cylinder 24 and diverter cylinder 22 when operating out of phase of each other provide complete transverse layers of material 20 and then of material 16 alternatively, the use of a single diverter cylinder 24 is sufficient to produce an acceptable product wherein material 20 separates easily or in products were complete transverse layers of material 20 are not necessary or desirable, such as stick-held confections. Therefore, varying the expressions in the relation (X+YL.P.M.), And or varying the input volumes into inlet conduits 14 and 18, or disabling one of the diverter cylinders, will provide a variety of different and programmable product configurations.

DESCRIPTION

FIG. 3

Figure 3:
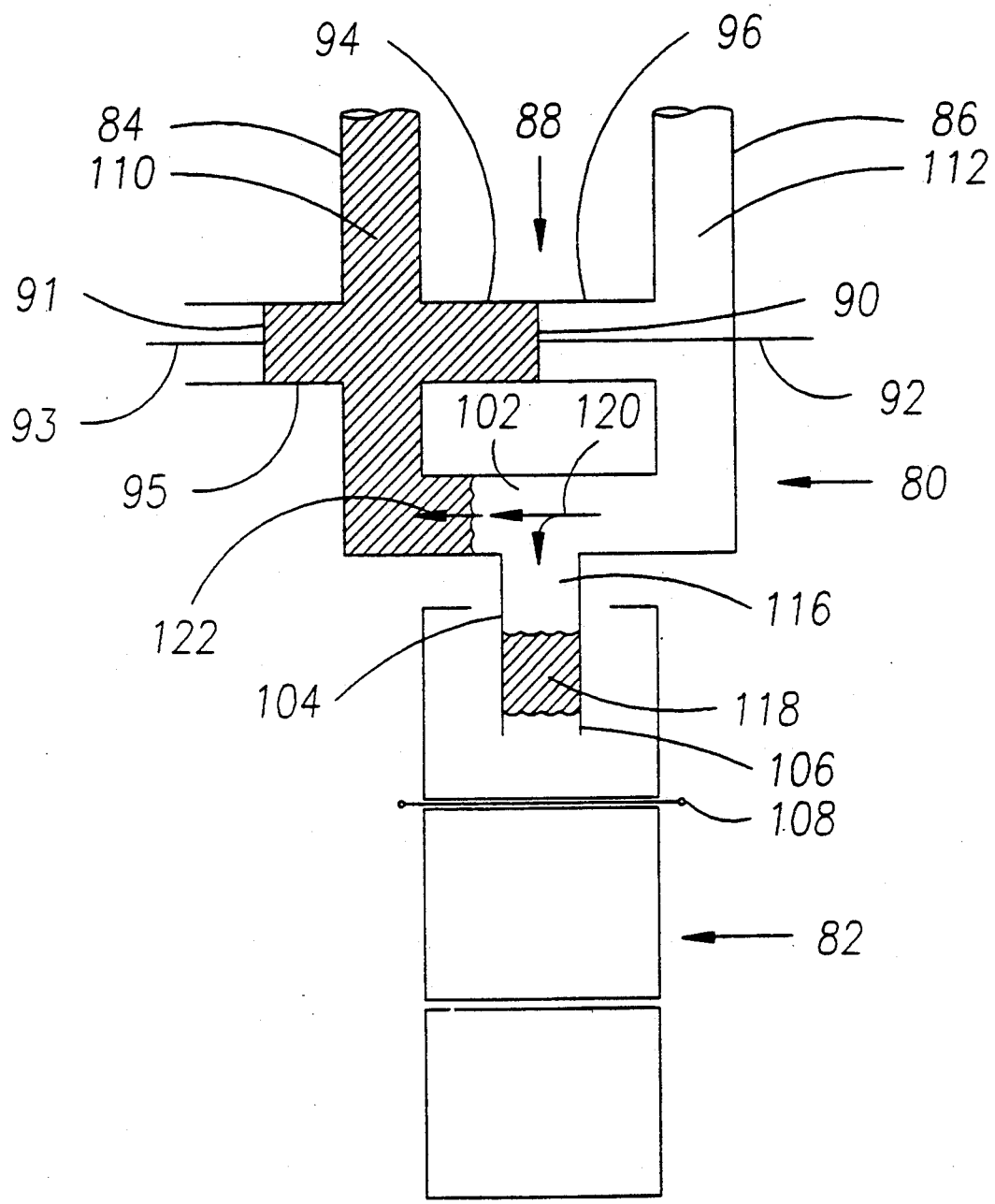
FIG. 3 Is a schematic view of an extruder apparatus according to the present invention for producing transversely layered extruded and cut frozen confections adaptable to include discrete material.

A preferred embodiment of the present invention, for producing transversely layered extruded and cut frozen confections, is illustrated in FIG. 3 In which there is shown a schematic sectional view of an extruder apparatus 80 situated over a conveyor 82. A first conduit 84 is disposed to accept a first flow of a first material 110 from conventional blenders not shown, and a second conduit 86, of equal cross sectional area, is disposed to accept a second flow of a second material 112 from conventional blenders not shown.

Downstream, and forming an opening into and joining conduits 84 and 86, is a cylinder 88 which is provided with a piston 90 that is driven by a piston rod 92. Piston 90 is disposed in cylinder 88 to act as a moving boundary in cylinder 88 and thus segmenting cylinder 88 into a diverter cylinder 94 and a diverter cylinder 96. Piston rod 92 is disposed and adaptable to be driven by conventional methods such as an adjustable air cylinder or a cam driven by a variable speed motor timed and adjusted to conveyor 82 by conventional phaser methods.

Diverter cylinder 94 is disposed onto the first conduit 84 to enable the extraction or injection of the first material 110 from the first conduit 84 to form a first intermittent flow, and diverter cylinder 96 is disposed onto the second conduit 86 to enable the extraction or injection of the second material 112 into or out of the second conduit 86 to form a second intermittent flow. Further downstream from the diverter cylinders the two separate conduits 84 and 86 join to form a confluence 102 which forms into a common extruder spout 104 with a die end 106.

A conventional cutter mechanism 108, such as a heated wire, is situated to sever the extrusion at die end 106 of extruder spout 104.

OPERATION

FIGS. 3, AND 4

Figure 4:
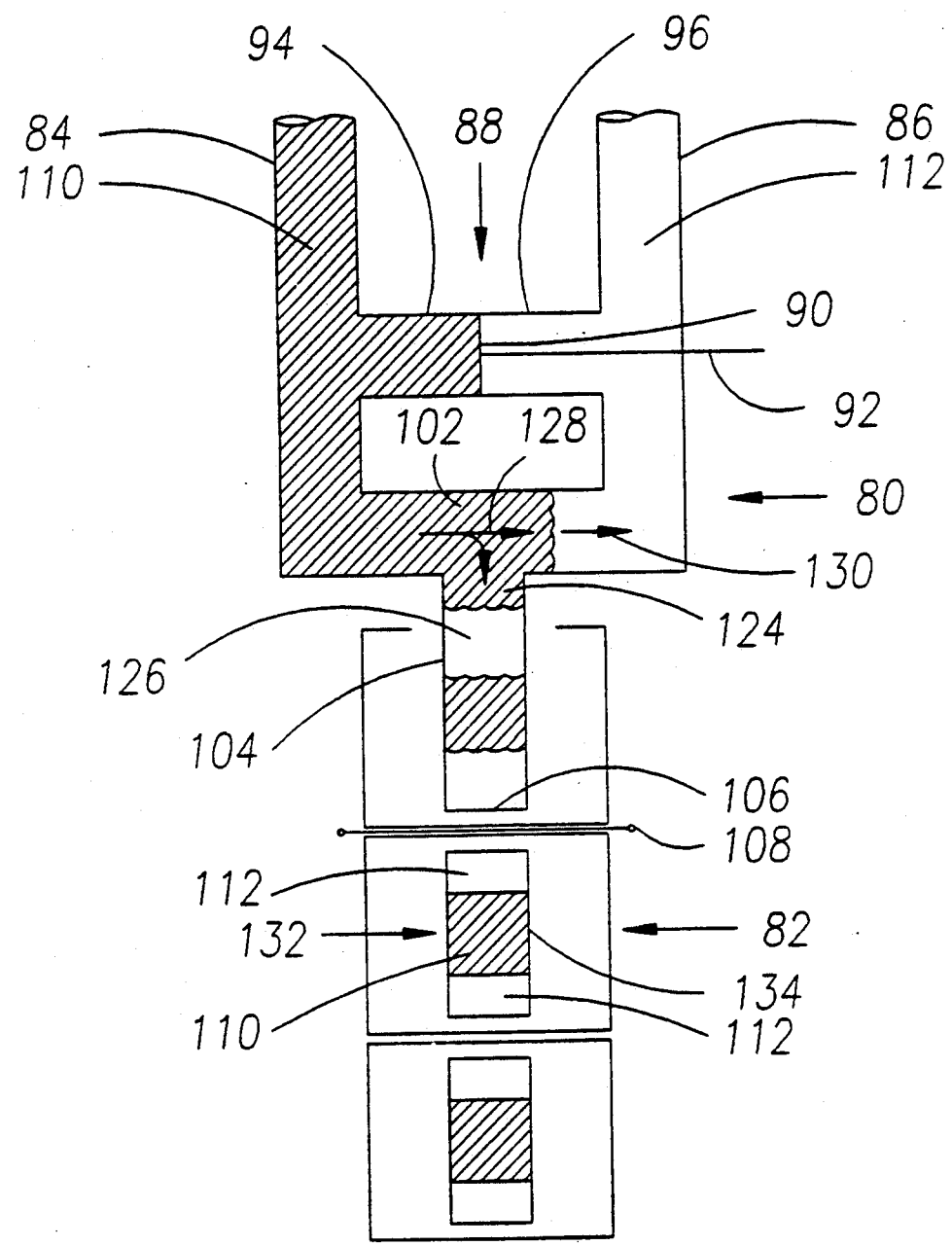
FIG. 4 Is a partial sectional view of the apparatus shown in FIG. 3.

The operation of the extruder apparatus is illustrated in FIGS. 3 And 4 in which, for descriptive purposes, the commencement of the cycle is shown in FIG. 3, Where from suitable blenders not shown, two separate blends of ice cream, or other edible material, are introduced at a first flow to the first conduit 84, and at a second flow to the second conduit 86. The first flow and the second flow in this description are equal and constant controlled input volumes of (XL.P.M.) Each, to each of the separate conduits 84 and 86 of extruder apparatus 80. For example; the first conduit 84 could be for the introduction of a first material, which is a blend of ice cream 110 containing discrete material such as peanuts or other edible solids at a first flow, which in this description is (XL.P.M.), And the second conduit 86 could be for the introduction of a second material, such as a smooth easily severed blend of ice cream 112 without discrete material at a second flow, which in this description is (XL.P.M.).

Piston rod 92 is driven by conventional mechanical or other method and timed to conveyor 82 and cutter 108 by conventional methods such as by a candy switch, or phaser apparatus.

The diverter cylinders are out of phase with each other, therefore, when diverter cylinder 94 extracts material 110 by the action of piston rod 92 driving piston 90, diverter cylinder 96 injects material 112. Likewise when diverter cylinder 94 injects material 110, diverter cylinder 96 extracts material 112.

The diverter cylinders 94 and 96 are adjusted by altering the stroke and velocity of piston rod 92 by conventional methods to accomodate a volume per given time equal to the first flow into the first conduit (XL.P.M.), Plus an extra amount (YL.P.M.), For a total of (X+YL.P.M.) For each of the diverter cylinders wherein:

$M = (30/V)$ is the tentative time in seconds required to produce one transverse layer of material in the composing chamber 102 when the conveyor 82 moves at a rate of (V) plates per minute.

$X =$ a volume in liters per (M) introduced by the blender and determined by the volume of the desired confection.

$Y =$ a volume, usually a percentage of (X), relating to a material's resistance to separate when pulled apart. In practice the value of (Y) must be determined empiricly by the practitioner in the process of setting up the product and its parameters. Generally the value for (Y) can be lower for a material which separates easily and or contains small particulates, and higher for sticky, difficult-to-separate material and or containing large particulates.

When a diverter cylinder is in the injecting part of its cycle, the net flow down stream in its system of the extruder apparatus is;

the controlled input rate from the blender, plus the volume the diverter cylinder is injecting, which is:

$$(XL.P.M.) + (X + YL.P.M.) = (2X + YL.P.M.)$$

In other words, while a diverter cylinder is injecting material, into a conduit, the flow down stream, in it's system of the extruder apparatus, more than doubles.

Conversely while a diverter cylinder is extracting material, from a conduit, the net flow downstream in its system of the extruder apparatus is;

the controlled input rate from the blender, minus the volume the diverter cylinder is extracting, which is:

$$(XL.P.M.) - (X + YL.P.M.) = (-YL.P.M.)$$

In other words, while a diverter cylinder is extracting material, the flow of material down stream in its system of the extruder apparatus is reversed and momentarily flows backwards. The flow reversal is induced by the difference in rate between the controlled input rate from the blender (XL.P.M.) And the volume the diverter cylinder is extracting, (X+YL.P.M.)

The difference being (−YL.P.M.), The value (Y) determines the magnitude of backward flow.

The momentary flow reversal in one conduit 84 coincides with the momentary flow increase in the other conduit 86 creating a pressure differential in that portion of the extruder apparatus where conduits 84 and 86 join to form a confluence 102 such that;

When diverter cylinder 94 is extracting material, the momentary flow reversal is in conduit 84, inducing a momentary pressure drop in conduit 84 and concurrently diverter cylinder 96 is injecting material, inducing a momentary pressure increase in conduit 86. The boundary of pressure differential occurs where conduits 84 and 86 join to form a confluence 102. This pressure differential causes material 112 in conduit 86 with the higher pressure to exert a pushing force 120 on the lower pressure material 110 in conduit 84, while material 110 in conduit 84 with the lower pressure and reverse flow exerts a backward pulling force 122 on material 110 in conduit 84 forcing material 110 in conduit 84 backwards and away from the confluence 102 and far enough backwards determined by the value (Y) to assure that none of material 110 from conduit 84 remains in a transverse section 116 of the confluence 102, therefore momentarily filling a transverse section 116 of the confluence 102 exclusively with material 112 from conduit 86, and positively separating material 110 of conduit 84 from its parent material 118 swept down stream. Conversely when the momentary flow reversal is in conduit 86 induced by diverter cylinder 96 extracting material while diverter cylinder 94 is injecting material (referring now to FIG. 4) There is a momentary pressure drop in conduit 86 and a momentary pressure increase in conduit 84. The boundary of pressure differential occurs where conduits 84 and 86 join to form the confluence 102. This pressure differential causes material 110 in conduit 84 with its higher pressure to exert a pushing force 128 on the lower pressure material 112 in conduit 86, while material 112 in conduit 86 with its lower pressure and reverse flow exerts a backward pulling force 130 on the material 112 in conduit 86 forcing material 112 in conduit 86 backwards and away from the confluence 102 and far enough backwards determined by the value (Y) to assure that none of the material 112 in conduit 86 remains in a transverse section 124 of the confluence 102, therefore momentarily filling transverse section 124 of the confluence 102 exclusively with material 110 from conduit 84 and positively separating material 112 in conduit 86 from its parent material 126 swept downstream.

Since the complimentary action of the diverter cylinders cancel each other, the net flow out of extrusion die 106 remains a constant (2XL.P.M.), The extruded material is however transversely layered due to the cycling action of the diverter cylinders, half of the time the material extruded will be free of discrete material, and half of the time the material extruded will contain discrete material.

Cutter 108 is timed and adjusted by conventional phaser methods to cut through the extrusion when extruded material exiting die end 106 of extruder spout 104 is free of discrete material, thus providing an extruded and cut frozen confection 132 with cut ends of easily cut particulate free material 112 and containing a transverse layer 134 containing discrete material 110. The customary separation and centering of the cut frozen confection 132 on the conveyor 82 is achieved by oscillating extruder apparatus 80 by conventional cam methods timed and adjusted by conventional phaser methods to conveyor 82, the product is then conveyed by conveyor 82 for further processing and or packaging.

For greater control of the transverse layers forming in the confluence 102, an extra diverter cylinder, such as diverter cylinder 95 with piston 91 and piston rod 93 driven by suitable conventional methods, can be added to either or both conduits, thus providing a more flexible way of altering the value for (y) when setting up the parameters for a new product.

DESCRIPTION

FIG. 5

Figure 5:
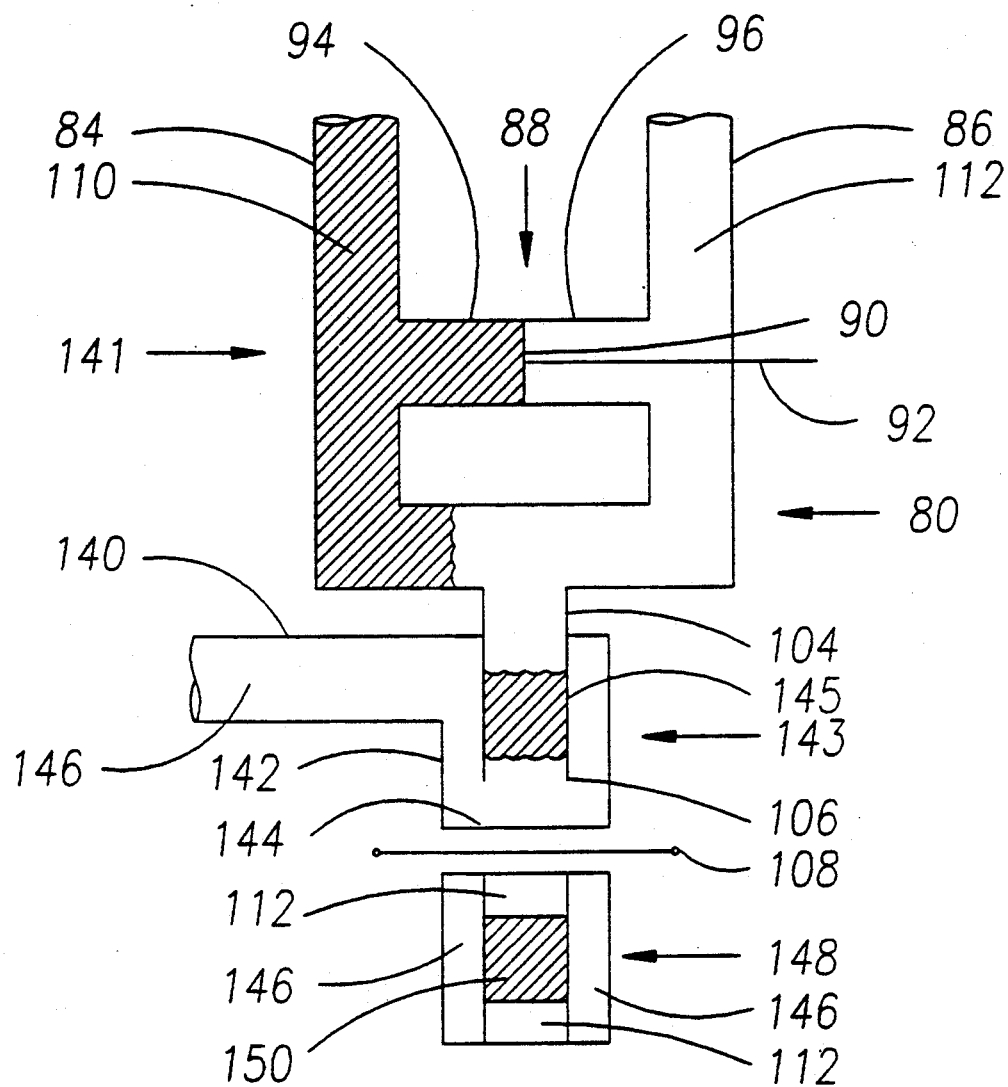
FIG. 5 Is a schematic view of an extruder apparatus according to the present invention, for producing extruded and cut frozen confections containing a transversely layered filling material sleeved with a coating material.

Another preferred embodiment of the present invention is an apparatus for producing extruded and cut frozen confections in which one material sleeves another material, is illustrated in FIG. 5 in which a common extruder apparatus 141 is composed of an extruder apparatus 80 producing alternating transverse layers of material 110 and 112 as described in the description and operation of FIGS. 3 and 4, has a third conduit 140 disposed to join extruder spout 104 of extruder apparatus 80 coaxially, such that extruder spout 104 forms the inner conduit 145 and the third conduit 140 forms the outer conduit 142 of a common extruder spout 143. The outer conduit 142 has a die end 144 at its terminus, which is disposed downstream from the die end 106 of the inner conduit 145. A conventional cutter mechanism 108 such as a hot wire, is timed by conventional methods and is disposed to sever the extrusion as it exits from the common extruder spout 143 at the die end 144.

OPERATION

FIG. 5

The operation of the common extruder apparatus 141 is illustrated in FIG. 5, where from blenders not shown, separate blends of ice cream, or other edible material, are introduced at a constant controlled input volume of (XL.P.M.), that is, (X liters per minute), to separate inlet conduits 84 and 86 of extruder apparatus 80 of the common extruder apparatus 141. For example the first conduit 84 could be for the introduction of a first material 110 containing discrete material such as peanuts or other edible solids at (XL.P.M.), and the second conduit 86 could be for the introduction of a second material 112 a smooth easily severed blend of ice cream without discrete material at (XL.P.M.). In addition, from a suitable blender not shown, a third material, a blend of smooth easily severed ice cream 146 is introduced at a controlled input volume into the third conduit 140 of the common extruder apparatus 141. The input volume into conduit 140 is adjusted and set to allow material in the outer conduit 142 to exit at the same velocity as material in the inner conduit 145 of the common extruder spout 143.

A conventional cutter apparatus 108 is timed and adjusted by conventional phaser methods to sever the extrusion when the extruded material exiting the die end 144 is the second material 112 which is the blend of smooth easily severed ice cream, thus providing an extruded and cut frozen confection 148 with cut ends of easily cut particulate free materials 146 and 112, and containing an encapsulate 150 comprised of a blend of material 110 with discrete material such as peanuts or other edible solids.

DESCRIPTION

FIG. 6

Figure 6:
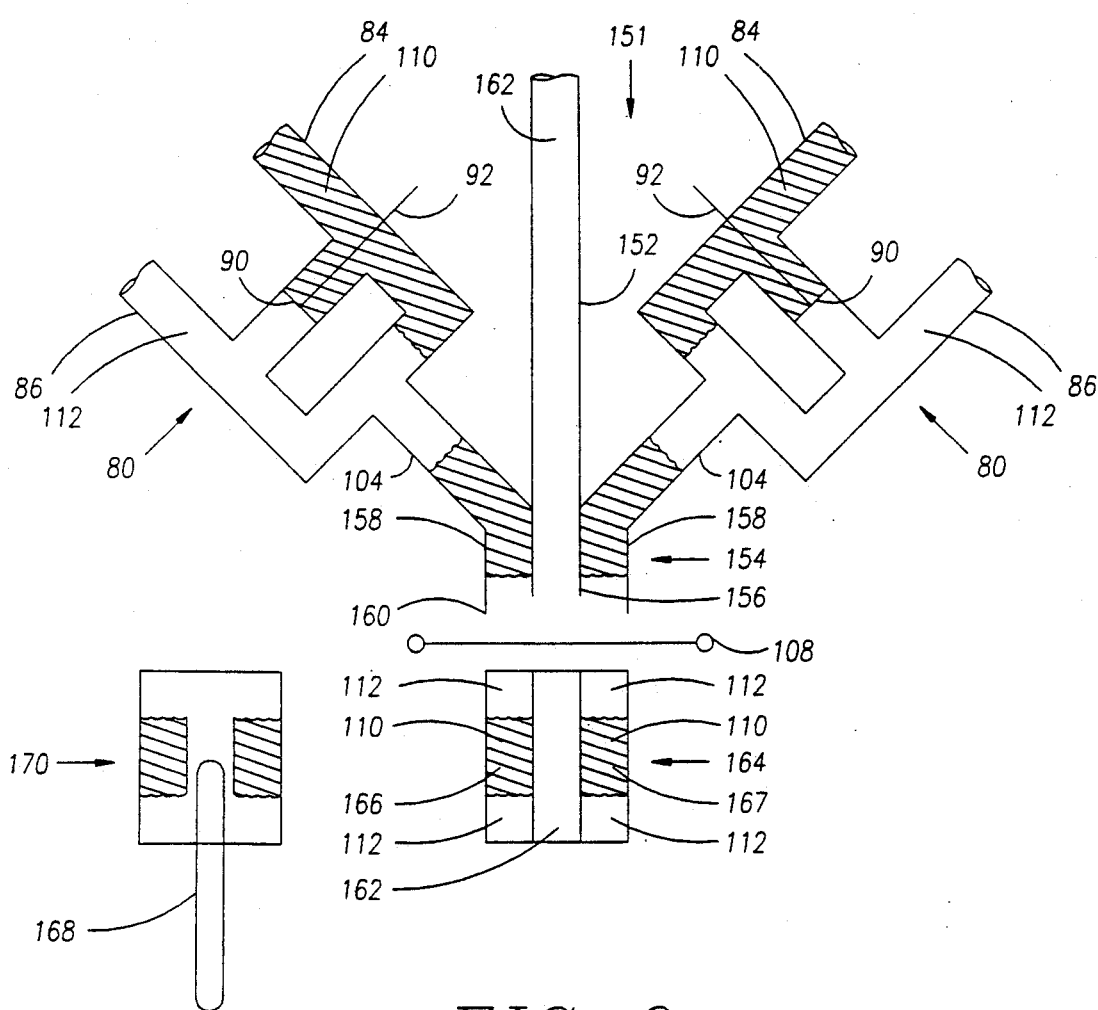
FIG. 6 Is a schematic top view of a horizontal extruder apparatus according to the present invention for producing a variety of multi-ingredient extruded and cut frozen confections with provision to include discrete material and adaptable to stick-held products.

Another embodiment of the present invention is an apparatus for producing extruded and cut frozen confections in which a material containing particulates, such as peanuts, is located within the extruded and cut confection but not in the area traversed by the segmenting means or the area subsequently occupied by a stick in stick-held products, and is illustrated in FIG. 6 in which a common extruder apparatus 151 contains two extruder apparatuses 80, each producing alternate transverse layers of material 110 and 112 as described in the description and operation of FIGS. 3 and 4. These extruder apparatuses 80 are disposed to enable their respective extruder spouts 104 to parallel an inlet conduit 152, thus forming a common extruder spout 154 composed of an inner conduit 156, straddled by the outer conduits 158.

Part of the common walls between the inner and outer conduits are cut back, allowing die end 160 to extend past the end of inner conduit 156 and thus provide the customary knitting time for the various materials prior to segmenting the extrusion. A conventional cutter mechanism 108 such as a hot wire, is timed by conventional methods and disposed to sever the extrusion as it exits from the die end 160 of the common extruder spout 154.

OPERATION

FIG. 6

The operation of the extruder is illustrated in FIG. 6 where from blenders not shown, separate blends of ice cream, or other edible material, are introduced at a constant controlled input volume of (XL.P.M.), to each of the separate conduits 84 and 86 of the two extruder apparatuses 80 of the common extruder apparatus 151. For example, each of the first conduits 84 could be for the introduction of a first material 110, a blend of ice cream containing discrete material such as peanuts or other edible solids at (XL.P.M.), and each of the second conduits 86 could be for the introduction of a second material 112, a smooth easily severed blend of ice cream at (XL.P.M.).

The piston rods 92 of the extruder apparatuses 80 are disposed and adaptable to be driven by conventional methods and timed by conventional phaser methods to assure that the transversely layered material in each of the straddling conduits 158 reaches the cutter 108 in phase with the other.

In addition, from a suitable blender not shown, a third material 162, which is a smooth easily severed material is introduced at a controlled input volume into conduit 152 of the common extruder apparatus 151. The input volume into conduit 152 is adjusted and set to allow material in the center conduit 156 to exit at the same velocity as material in the straddling conduits 158 of the common extruder spout 154.

Cutter 108 is timed and adjusted by conventional phaser methods to sever the extrusion when the extruding material exiting is free of discrete material, thus providing an extruded and cut frozen confection 164 with cut ends of easily severed particulate free material 162 and 112, and including sections 166 and 167 of material 110 containing discrete material such as peanuts or other edible solids, but not in the area for subsequent stick 168 insertion, thereby providing an extruded and cut stick-held confection 170 containing discrete material such as peanuts or other desirable particulates.

While preferred embodiments of the present invention have been disclosed, it will be understood that it is not limited thereto but may be otherwise embodied within the scope of the following claims.

What is claimed is:

1. An apparatus for manufacturing an extruded frozen confection, comprising;
   (a) a first conduit disposed to accept from suitable blender means, a first flow of a first material, and
   (b) a first diverter means opening into said first conduit is disposed to enable the extraction or injection of said first material into or out of said first conduit at a rate equal to or greater than said first flow, forming a first intermittent flow downstream in said first conduit, and,
   (c) a second conduit disposed to accept from suitable blender means, a second flow of a second material, and,
   (d) a confluence of said first conduit and said second conduit, downstream from where said first diverter means joins said first conduit, whereby when said first diverter means is extracting said first material from said first conduit at a rate greater than said first flow, said first material cessates its entry into said confluence and reverses direction to flow towards said first diverter means, thus allowing a transverse section of said confluence to be filled exclusively with said second material from said second conduit, and alternatively when said first diverter means is injecting said first material into said first conduit, a section of said confluence is filled with said first material from said first conduit.

2. The apparatus of claim 1 further comprising one or more second diverter means out of phase of said first diverter means and opening into said second conduit such that said second diverter means is diposed to enable the extraction or injection of said second material into or out of said second conduit at a rate equal to or greater than said second flow, forming a second intermittent flow, out of phase of said first intermittent flow.

3. The apparatus of claim 1 wherein said first material contains substantial particulates, and said second material is easily severed.

4. The apparatus of claim 1 wherein said second flow substantially equals said first flow.

5. The apparatus of claim 1 further comprising a severing means disposed to sever the extrusion into individual confections when a transverse section of the easily severed second material is exiting the extruder.

6. The apparatus of claim 1 wherein said first diverter means is one or more cylinders with one or more pistons, driven by suitable means.

7. The apparatus of claim 1 wherein said first diverter means is a cylinder with a diaphragm, driven by suitable means.

8. An apparatus for manufacturing a programmable extruded product, comprising;
   (a) a plurality of conduits, each disposed to accept a flow of material from suitable blender means, and
   (b) a plurality of diverter means, each forming an opening into and joining one each of said conduits, and each of said diverter means are driven by means, to extract or inject material into or out of the conduit it joins, and each of said diverter means are timed by means to control the phase of each of said diverter means separately, and each of said diverter means can be selectively disabled by suitable switching means, and
   (c) a spout formed by the confluence of said conduits downstream from where said diverter means join said conduits, whereby sections of said spout are alternately filled by the cycling action of said diverter means, forming a programmed layered extrusion in said spout.

9. An apparatus according to claim 8 wherein one or more of said diverter means is in phase with one or more of said diverter means.

10. An apparatus according to claim 8 wherein one or more of said diverter means is out of phase of one or more of said diverter means.

11. An apparatus according to claim 8 wherein said diverter means is a cylinder with a piston disposed to be driven by suitable means.

12. An apparatus according to claim 8 wherein; one or more of said conduits accepts material containing particulates, and one or more of the other of said conduits accepts easily severed material.

13. An apparatus according to claim 8 further comprising; a segmenting means, disposed and timed to sever said programmed layered extrusion when a transverse layer of easily severed material is exiting said spout.

* * * * *